(12) United States Patent
Van Den Brand et al.

(10) Patent No.: US 10,604,213 B2
(45) Date of Patent: Mar. 31, 2020

(54) BICYCLE TRANSMISSION FOR USE BETWEEN A CHAIN WHEEL CARRIER AND A WHEEL HUB OF A BICYCLE, AS WELL AS REAR AXLE AND REAR WHEEL PROVIDED WITH SUCH A TRANSMISSION

(71) Applicant: Advancing Technologies B.V., Eindhoven (NL)

(72) Inventors: Johannes Gijsbertus Antonius Van Den Brand, Eindhoven (NL); Roëll Marie Van Druten, Eindhoven (NL)

(73) Assignee: ADVANCING TECHNOLOGIES B.V., Eindhoven (NL)

( * ) Notice: Subject to any disclaimer, the term of this patent is extended or adjusted under 35 U.S.C. 154(b) by 107 days.

(21) Appl. No.: 15/756,125

(22) PCT Filed: Aug. 29, 2016

(86) PCT No.: PCT/NL2016/050601
§ 371 (c)(1),
(2) Date: Feb. 28, 2018

(87) PCT Pub. No.: WO2017/039440
PCT Pub. Date: Mar. 9, 2017

(65) Prior Publication Data
US 2018/0244348 A1 Aug. 30, 2018

(30) Foreign Application Priority Data
Aug. 28, 2015 (NL) ...................................... 2015370

(51) Int. Cl.
*B62M 11/16* (2006.01)
(52) U.S. Cl.
CPC .................................. *B62M 11/16* (2013.01)
(58) Field of Classification Search
None
See application file for complete search history.

(56) References Cited

U.S. PATENT DOCUMENTS 2,731,857 A * 1/1956 Marino ...................... B62L 5/14
475/296
3,513,725 A * 5/1970 Shimano ................... B62M 9/10
475/259
(Continued)

FOREIGN PATENT DOCUMENTS

DE 9408910 U1 7/1994
EP 2022713 A2 2/2009
(Continued)

OTHER PUBLICATIONS

International Search Report PCT/NL2016/050601 dated Feb. 7, 2017.
(Continued)

*Primary Examiner* — Dirk Wright
(74) *Attorney, Agent, or Firm* — Pillsbury Winthrop Shaw Pittman, LLP

(57) ABSTRACT

A transmission intended to be mounted on a rear wheel axle of a bicycle between a sprocket carrier and a wheel hub has a transmission housing, which is provided with connecting means for the connection of the sprocket carrier to the transmission housing, as well as coupling means for coupling the transmission to the hub. The transmission further has a planetary gear set which is present in the transmission housing and is provided with three rotational members, of which a first rotation body is connected to the transmission housing, a second rotation body is connected to the coupling means, and a third rotation body can be coupled with the wheel axle. The first rotation body is connected via a first clutch to the second rotation body and the third rotation body is connected to a second clutch via which the third rotation body can be connected to the wheel shaft.

16 Claims, 3 Drawing Sheets

(56) References Cited

U.S. PATENT DOCUMENTS

| | | | | |
|---|---|---|---|---|
| 4,294,138 A * | 10/1981 | Fukui | B62M 11/16 192/47 |
| 4,400,999 A * | 8/1983 | Steuer | B62M 11/16 192/217.3 |
| 5,399,128 A | 3/1995 | Nurnberger | |
| 5,562,563 A * | 10/1996 | Shoge | B62M 11/18 475/289 |
| 5,863,270 A * | 1/1999 | Chen | B62M 11/14 475/289 |
| 6,258,005 B1 * | 7/2001 | Rohloff | B62M 11/18 475/277 |
| 6,428,437 B1 | 8/2002 | Schlanger | |
| 6,478,711 B2 * | 11/2002 | Yoo | B62M 11/16 475/289 |
| 8,052,568 B2 * | 11/2011 | Hino | B62M 11/18 475/12 |
| 8,992,375 B2 * | 3/2015 | Gobel | B62M 11/16 475/292 |
| 9,180,930 B2 * | 11/2015 | Bettin | B62K 25/005 |
| 9,688,352 B2 * | 6/2017 | Taitt | B62M 6/65 |
| 10,041,567 B2 * | 8/2018 | Liu | B62M 11/16 |
| 2009/0042682 A1 | 2/2009 | Dal Pra' et al. | |
| 2012/0244976 A1 | 9/2012 | Lin | |
| 2016/0305496 A1 * | 10/2016 | Liu | F16D 21/04 |
| 2016/0362160 A1 * | 12/2016 | Van Druten | B60B 35/04 |

FOREIGN PATENT DOCUMENTS

| | | |
|---|---|---|
| GB | 2166502 A | 5/1986 |
| WO | 01/44042 A1 | 6/2001 |

OTHER PUBLICATIONS

Written Opinion of the International Searching Authority dated Feb. 7, 2017 issued in corresponding International Patent Application No. PCT/NL2016/050601.

International Preliminary Report on Patentability dated Mar. 6, 2018 issued in corresponding International Patent Applcation No. PCT/NL2016/050601.

First Office Action dated Jun. 26, 2019 issued in corresponding Chinese Patent Application No. 201680061682.4 with English translation.

* cited by examiner

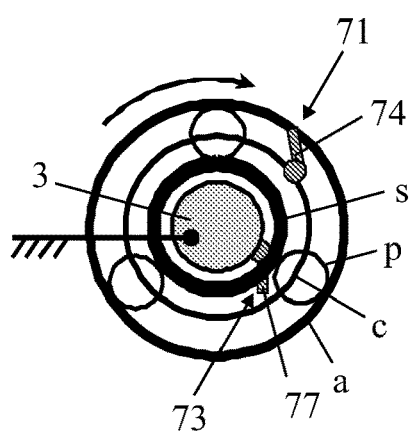
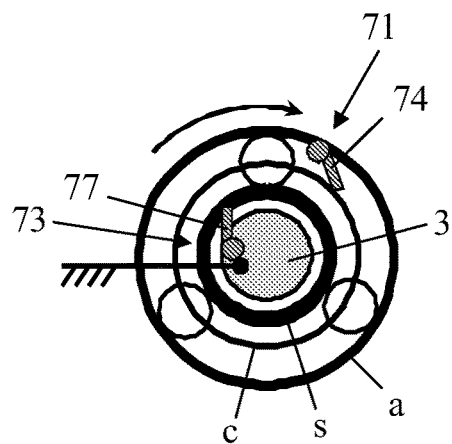
FIG. 3  FIG. 4
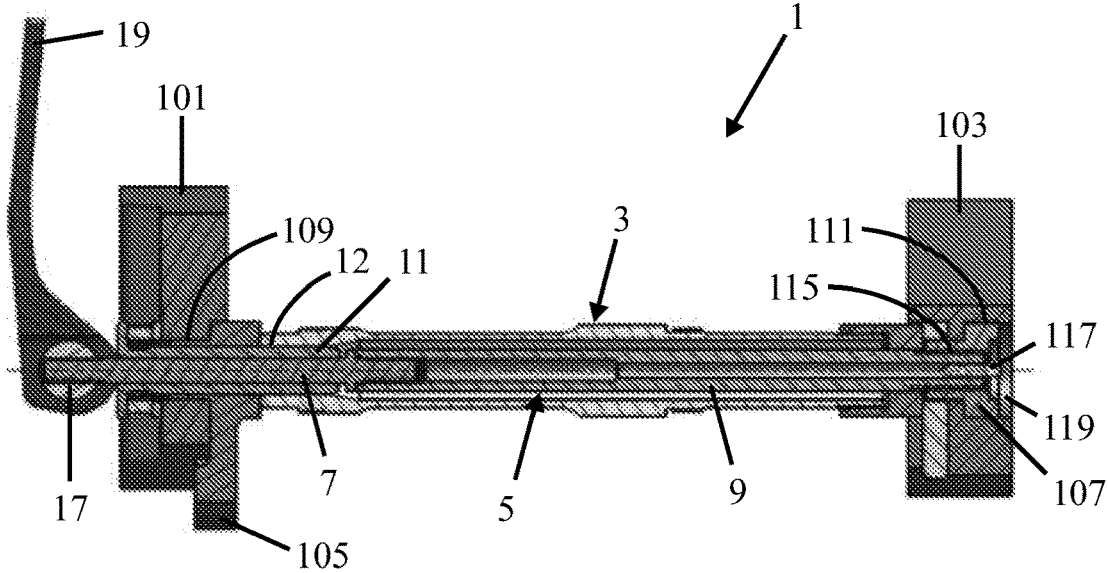
FIG. 5
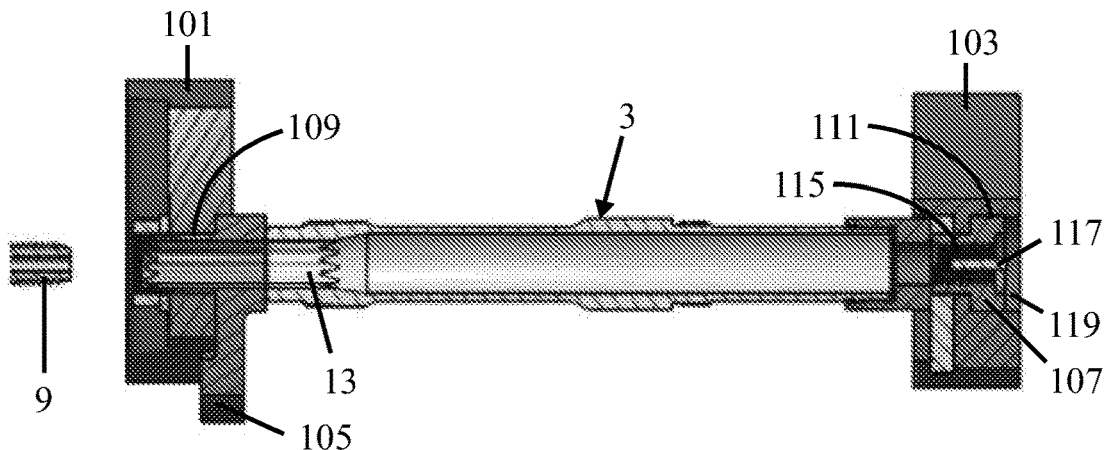
FIG. 6

BICYCLE TRANSMISSION FOR USE BETWEEN A CHAIN WHEEL CARRIER AND A WHEEL HUB OF A BICYCLE, AS WELL AS REAR AXLE AND REAR WHEEL PROVIDED WITH SUCH A TRANSMISSION

FIELD OF THE INVENTION

The invention relates to a transmission for between a sprocket or a sprocket carrier and a wheel hub of a rear wheel of a bicycle, which transmission is intended to be mounted on a wheel axle of the rear wheel of the bicycle, and which transmission comprises a transmission housing, that it is provided with connecting means for connecting of the sprocket or the sprocket carrier with the transmission housing or which is integral with the sprocket carrier, which transmission further comprises coupling means for coupling the transmission with the wheel hub, and which transmission further comprises a planetary gear set which is present in the transmission housing and is provided with three rotational members, of which a first rotation body forms a ring wheel and is connected to the transmission housing, a second rotation body forms a planet carrier and is connected to the coupling means and a third rotation body forms a sun wheel and is engageable with the wheel axle.

STATE OF THE ART

Such a transmission is known from U.S. Pat. No. 3,513,725 A. In this known transmission, the third rotation body (sun gear) is fixedly connected to the wheel axle, which—in the case the transmission is applied in a bicycle—is fixedly connected to the frame of the bicycle. A disadvantage of this known transmission is that it produces an audible sound when there is a 1 to 1 transmission between the sprocket carrier and the wheel hub and therefore entails losses in the actuator. This is undesirable in high-end bicycles.

SUMMARY OF THE INVENTION

It is an object of the invention to provide a transmission of the type described in the opening paragraph, which, when mounted on a wheel axle of a rear wheel of a bicycle, during cycling produces less or no noise, and has less or no losses in the transmission than the well-known transmission. For this purpose, the bicycle according to the invention is characterized in that the first rotation body is connected to the second rotation body via a first clutch and the third rotation body is connected to the wheel axle via a second coupling. Between said rotation bodies, wheel axle and clutches there can, of course, also be further couplings. Because in a 1 to 1 transmission (first clutch closed) in the transmission according to the invention, the planet gears do not rotate around their axis, the transmission at a 1 to 1 transmission has no gears which rotate relative to each other. That the planet gears do not rotate around their axes is because the sun gear is not fixedly connected to the stationary wheel axle in case of a 1 to 1 transmission (second clutch open). In particular, the planet gears rotating around their axes causes noise and has a less good efficiency as a result. By fixing the planet wheels in relation to their axes less sound is produced in case of a 1 to 1 transmission.

Preferable, the first clutch is designed as a switchable clutch, preferably as a clutch with switchable pawls (form-closed coupling), which can fix the parts to be coupled relative to each other in the direction of rotation.

The first clutch, preferably, is designed as a clutch which under load (drive) of the transmission, both can couple as can decouple.

Also the second coupling, preferably, is designed as a disengageable clutch and also preferably as a switchable clutch with pawls (form-closed coupling), which can fix the parts to be coupled relative to each other in the direction of rotation. This allows the pawls of the freewheel clutch between the sun gear and the wheel axle to be switched into a disengaging position, so they can not rattle and therefore produce no sound.

Another preferred variant is that the second clutch is designed as a freewheel. A freewheel for example can be a freewheel bearing, a freewheel clutch, a one way bearing and a one-way clutch. Preferably, this freewheel is constructed as a freewheel bearing.

An embodiment of the bicycle according to the invention is characterized in that the transmission comprises a switching mechanism for switching of the switchable clutch or the switchable clutches, which switching mechanism is located inside the transmission housing.

Preferably, the switching mechanism comprises a ring which by axially moving or by tangentially rotating can operate the switchable clutch or the switchable clutches.

Further, the switching mechanism preferably comprises an electrical actuator, which actuator comprises a stator which is mounted on or in the wheel axle. As a result, no mechanical connection is required with control levers on the handlebar or frame of the bicycle, which mechanical connection moreover should be able to be upcoupled easily and quickly in order to be able to replace the rear wheel rapidly.

A further embodiment of the bicycle according to the invention is characterized in that that the ring and the actuator are present in the transmission housing at the side of the planetary gear set facing away from the coupling means.

A still further embodiment of the bicycle according to the invention is characterized in that the actuator is provided with connecting pins that stabbing through one or more openings in or over the wheel axle, and are isolated from the wheel axle.

Again a further advantageous embodiment of the bicycle according to the invention is characterized in that the second coupling is designed as a freewheel. This is a force-locked coupling. A freewheel bearing makes use of rollers, and not of pawls and thus makes less or no noise and therefore does not have to be switchable.

In an advantageous embodiment the transmission comprises a third clutch (75), which is present between the first rotation body (47) and the transmission housing (33) and is designed as a freewheel, preferably a freewheel clutch (form-closed), or a one-way bearing (force-closed). The advantage of this third clutch is that upon application of a rear derailleur the chain tension remains constant in the situation when (suddenly) no pedaling torque is passed through.

A further advantageous embodiment of the transmission according to the invention is characterized in that the transmission comprises a fourth clutch, which is present between the second rotation body or the first clutch, and the transmission housing and is designed as a freewheel.

The invention further relates to a rear wheel axle for a bicycle comprising a wheel axle as well as a transmission according to the invention and being mounted on the wheel axle, wherein the third rotation body is connected via the second clutch to the wheel axle.

Further, the invention relates to a rear wheel for a bicycle comprising a rear wheel axle according to the invention, as well as a wheel hub mounted on the wheel axle, and coupled to the transmission, which wheel hub near a first end is mounted on the wheel axle via a wheel hub bearing and at a second end is provided with further coupling means which are coupled to the coupling means of the transmission. This biasing force may be applied by an adjustable ring or spring between the wheel hub and the wheel axle. The wheel hub bearings can also be prestressed axially on the wheel shaft by a biasing force in the direction of the transmission. Preferably, the bearings of the transmission housing on the wheel shaft are hereby not axially prestressed. In this case, the support bearing is preferably designed as a groove bearing that can absorb the axial force of the wheel, so that this does not have to be done by the transmission housing bearings. To this end, the coupling sleeve is designed such that it can transmit the axial force of the wheel hub to the support bearing.

Preferably, the coupling means and the further coupling means are designed as a form-closed connection.

BRIEF DESCRIPTION OF THE DRAWING FIGURE

The invention will be further described hereinbelow in more detail with reference to an example of embodiment represented in the drawings of a rear wheel axle of a bicycle comprising a wheel hub and a driver according to the invention, in which drawings:

FIG. 3 and FIG. 4 show different preferred positions of the operable pawls in the couplings connected to the planetary gear set;

FIG. 5 shows a sectional view of the rear wheel axle where the wheel axle and axle shaft are locked in drop outs;

FIG. 6 shows a sectional view of the separate wheel axle of the rear wheel axle locked in the drop out;

DETAILED DESCRIPTION OF THE DRAWING FIGURES

Figure 1:
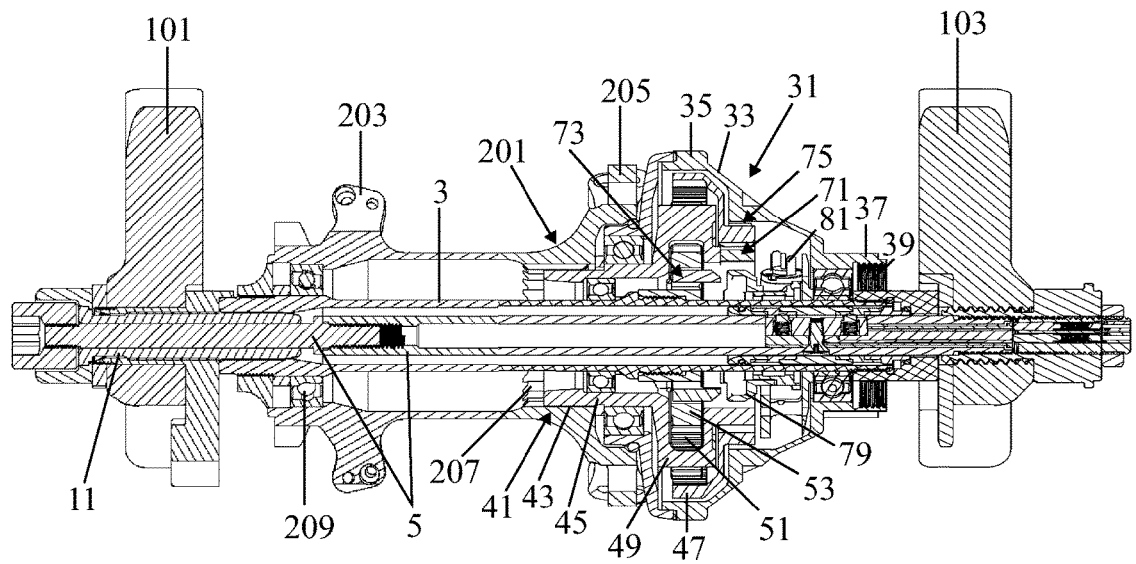
FIG. 1 shows a part of a rear heel present between drop outs of a bicycle frame of a bicycle.
Figure 2:
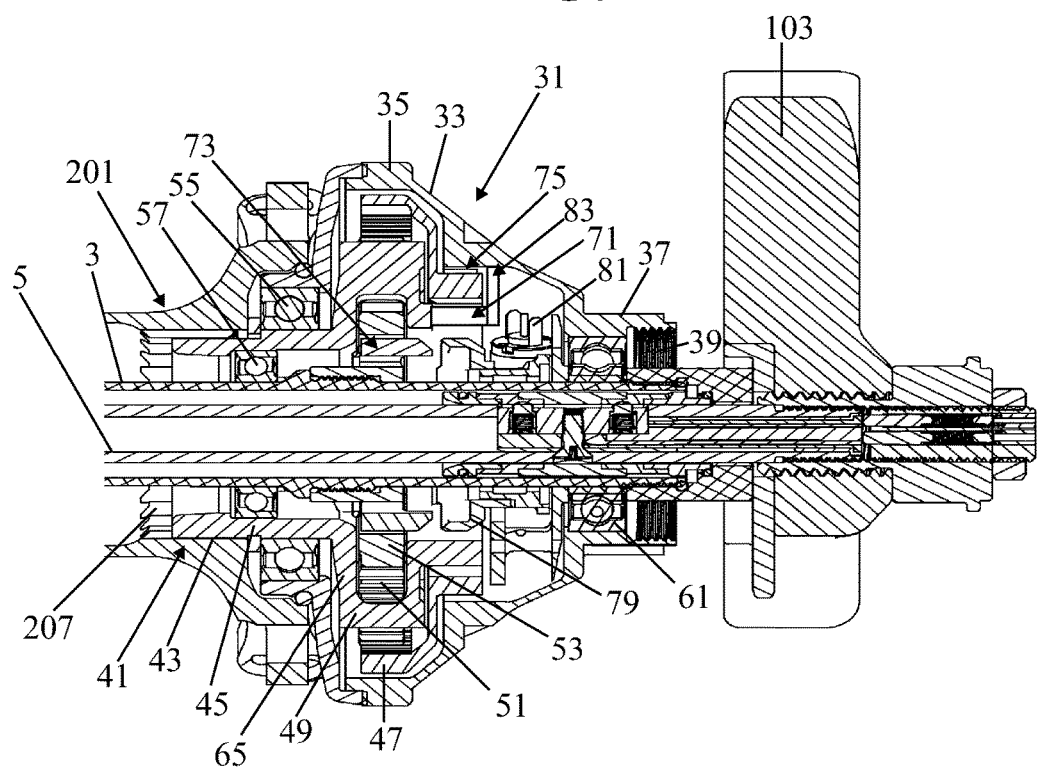
FIG. 2 shows a detail of the rear wheel illustrated in FIG. 1 at the location the driver.

FIG. 1 shows in a sectional view a part of a rear wheel 21 according to the invention, present between drop outs 101 and 103 of a bicycle frame of a bicycle. The rear wheel 21 comprises a rear wheel axle 1 and present thereon a transmission 23 and a wheel hub 201 whose end is bearing mounted to the wheel axle via bearing 209 and whose other end is coupled to the transmission 23.

The rear wheel axle 1 is composed of a wheel axle 3 and a axle shaft 5 inserted therethrough. The wheel axle 3 is hollow and is at one end provided with interal splines 13 for a form locked connection to one of the drop outs 101 of a rear fork of the bicycle frame (see FIG. 3). Via this form locked connection the wheel axle can support torque, which torque is a reaction torque of the drive between a driver body 33 of the driver and the wheel hub 201. The wheel hub 201 has two spoke franges 203 and 205 to which spokes (not shown) of the rear wheel are fixed. A sprocket carrier (not shown) with sprockets fitted thereto can be installed on the driver body 33 of the driver 31. To this end, the driver body 33 is provided with connecting means (toothings 35 and 37 and internal screw thread 39) via which the sprocket carrier provided with further connecting means can be connected to the driver body.

The driver 31 comprises two switchable drives between the driver body 33 and the wheel hub 201, as a result of which only a single sprocket on the crank axle will suffice, and a front derailleur of a bicycle may thus be omitted. The driver 31 is coupled via splines 41 to the wheel hub 201. These splines comprise internal splines 207 present in the wheel hub and external splines 43 on an output coupling bush 45 of the driver. The driver 31 together with the hollow wheel axle 3 to which it is attached forms a unit which can be inserted as a whole into the wheel hub 201 and together with the wheel hub (and the rest of the rear wheel the wheel hub forms part of) can be pushed in between drop outs 101 and 103 of a rear fork of a bicycle frame and also taken out.

The driver 31 comprises a planetary gear set having three rotational members, of which a first rotational member is formed by an annulus gear 47, a second rotational member is formed by a planet gear support 49 to which a plurality of planet gears 51 are bearing-mounted and which is connected to coupling means formed by the coupling bush 45 that has external splines 43, and a third rotational member is formed by a sun gear 53 which is connected to the wheel axle 3.

The first rotational member 47 is connected to the second rotational member 51 via a first switchable coupling 71 and the third rotational member 53 is connected to a second switchable coupling 73 via which the third rotational member can be connected to the wheel axle 3. The driver 31 further includes a switching mechanism for switching the switchable couplings 71 and 73. The switching mechanism is located in the space within the driver body 33 and has a sliding ring 79 which by axial displacement can operate the two couplings. The switching mechanism further includes an electrical actuator for displacing or rotating the sliding ring 79.

The driver further has a third coupling 75, which is present between the first rotation body 47 and the driver body 33 and which is preferably constructed as a one-way clutch or a one-way bearing, and a fourth clutch 83, which is present between the second rotation body 49 or the first clutch 71, and the driver body 33 and is likewise designed as a one-way clutch or a one-way bearing.

The sliding ring 79 and the actuator 81 are present in the driver body 33 on the planetary gear set side turned away from the coupling means 41. The actuator is connected electrically with electric conductors inside the wheel axle. The axle shaft is provided with connecting pins which protrude into the wheel axle through one or more openings and are isolated from the wheel axle and can contact the electrical conductors present in the wheel axle. Through the axle shaft the electrical contact can be lead further outside.

FIGS. 3 and 4 show two variants of operable pawls 74 and 77 of the couplings 71 and 73 in the planetary gear set. In this gear set the annulus gear is driven and planet gear support c forms the output. The sun gear s can be coupled to the wheel axle 3. FIG. 3 shows a first embodiment of the planetary gear set provided with operable pawls 74 and 77. The wheel axle 3 is in this case fixed to the frame of the bicycle. Pawl 77 is rotatably connected to the wheel axle 3 and is in engagement with the sun gear s. Pawl 74 is rotatably connected to the planet gear support c and is in engagement with annulus gear a.

FIG. 4 shows a second embodiment of the planetary gear set provided with operable pawls 74 and 77. Here the wheel axle 3 is fixed to the frame of the bicycle. Pawl 77 is rotatably connected to the wheel axle and is in engagement with the sun gear s. Pawl 74 is rotatably connected to the annulus gear a and is in engagement with the planet gear support c.

Between the coupling means (coupling bush 45) and the driver body 33 is located a first sealing which is formed by a left hand sealed driver body bearing 55 (first sealed ball bearing) whose outer peripheral side is connected to the driver body and whose inner peripheral side is connected to the coupling means (coupling bush 45). Between the coupling means (coupling bush 45) and the wheel axle 3 is located a second sealing which is formed by a support bearing 57 (sealed needle bearing). The sealing ring 59 of the support bearing is connected with its outer peripheral side to the coupling means (coupling bush 45). Between the driver body 33 and the wheel axle 3 is located a third sealing which is formed by a right-hand sealed driver body 61 (second sealed ball bearing) whose outer peripheral side is connected to the driver body. The outer peripheral side of the support bearing 57 is connected to the coupling means (coupling bush 45) and is present between the second and third sealing. The rollers 61 of the support bearing run over a roller face 63 present on the wheel axle 3.

The coupling means which are formed by the coupling bush 45 provided with external splines cooperate with further coupling means which are formed by the internal splines 207 present in the wheel hub 201. At the other end the coupling bush 45 is provided with a flange 65 which forms part of or is connected to the second rotational member. The left-hand driver body 55 is present here between the external splines 43 and the flange 65 on the coupling bush 45. The wheel hub 201 is bearing-mounted on the wheel axle 3 near a first end through a wheel hub bearing (not shown in the Figures) and at a second end is provided with the further coupling means which are formed by the internal splines 207.

Figure 7:
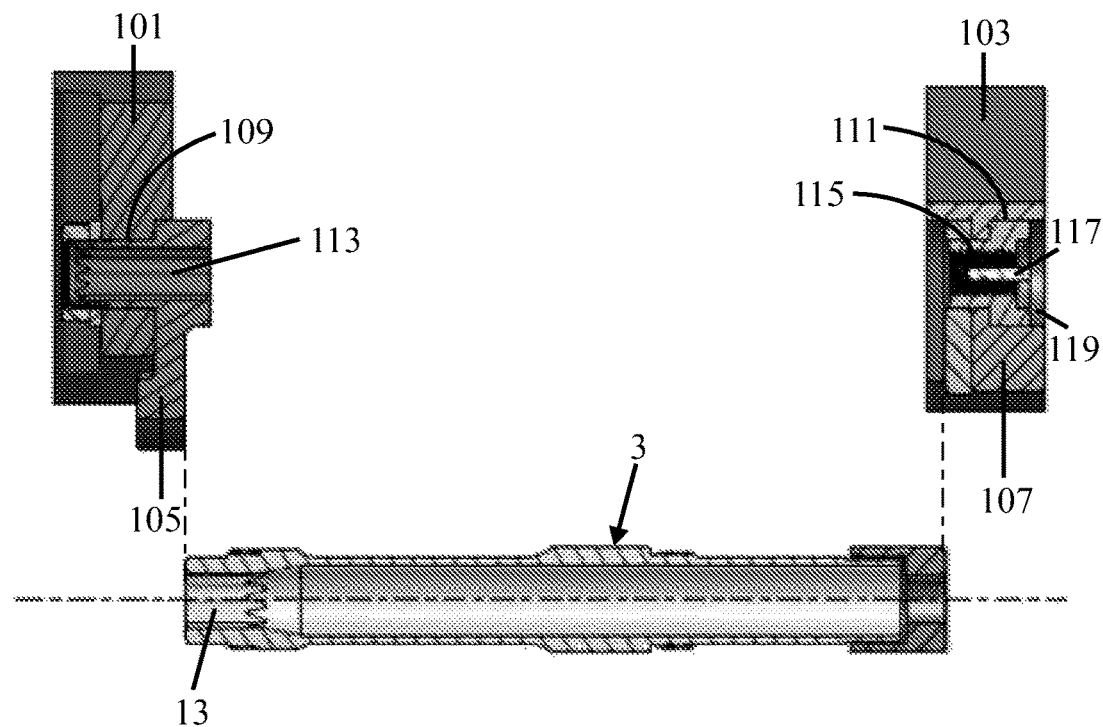
FIG. 7 shows a sectional view of the drop outs of a rear fork of a wheel axle of another rear wheel axle taken out of a bicycle frame.

FIG. 5 shows a sectional view of the rear wheel axle 1 fixed to the drop outs 101 and 103 of the rear fork of a bicycle. The rear wheel axle 1 comprises the hollow wheel axle 3 accommodating an axle shaft 5 inserted through it. The rear wheel axle comprises torque support means for supporting on a bicycle frame the torque exerted on the wheel axle. These torque support means are formed by internal splines 13 in the left-hand end of the hollow wheel axle (see FIGS. 5 and 6), internal splines 113 in a torque support arm 105 which is present in an opening 109 in the left-hand drop out 101 and which rests against the drop out (see FIG. 9), and external splines 12 (see FIGS. 5 and 8) on a bush 11 freely rotatable around a pin 7. The internal splines 13 in the wheel axle 3 and the right-hand part of the bush 11 here form a first form locked connection and the internal splines 113 in the torque support arm 105 and the left-hand part of the bush 11 form a second form locked connection. After removing the axle shaft 5 by removing same in axial direction from the wheel axle, the wheel axle 3 can be removed in radial direction from between the drop outs 101 and 103 of the rear fork (see FIG. 7).

Figure 8:
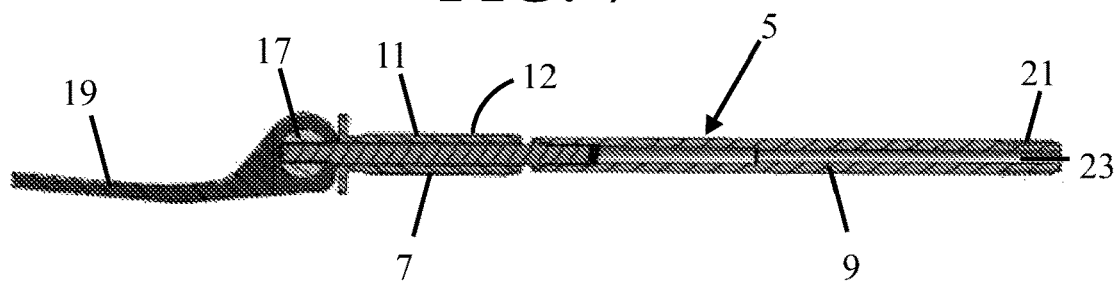
FIG. 8 shows a sectional view of the separate axle shaft of the rear wheel axle.

The pin 7 with the bush 11 freely rotating around it and with a further pin 9 connected to the pin 7 via a threaded connection jointly form the axle shaft 5 (see FIG. 8). The axle shaft has at its left end a lever 19 which is eccentrically connected to an axle 17 mounted to the end of the pin 7 and forms a quick release mechanism (see FIG. 8) for clamping the wheel axle 3 between the drop outs 101 and 103 of a bicycle frame. The free end of the further pin 9 is provided with external thread 21 which is turned into a cap 107 present in an opening 111 in the right-hand drop out 103, which cap has internal thread 115.

Figure 9:
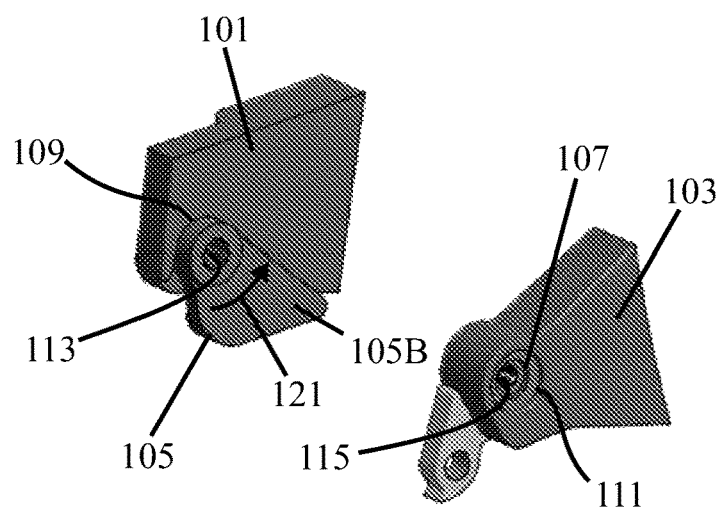
FIG. 9 shows a perspective view of the drop outs shown in FIG. 7.

FIG. 9 shows by way of illustration the drop outs 101 and 103 in a perspective view. The openings 109 and 111 in the drop outs accommodate inserts in the form of a torque support arm 105 that is provided with internal splines 113 and a hollow cap 107 that is provided with internal thread 115. An end 105B of the torque support arm 105 rests against the drop out 101 in the direction of rotation 121 so that this drop out 101 is locked against rotation and can thus support torque.

Albeit the invention has been elucidated in the foregoing with reference to the drawings, it should be set out that the invention is not by any manner or means restricted to the embodiments shown in the drawing figures. The invention also extends to any embodiments deviating from the embodiments shown in the drawing figures within the scope defined by the claims.

The invention claimed is:

1. A transmission for between a sprocket or a sprocket carrier and a wheel hub of a rear wheel of a bicycle, the transmission configured to be mounted on a wheel axle of the rear wheel of the bicycle, the transmission comprising:
a transmission housing provided with connecting means for connecting the sprocket or the sprocket carrier with the transmission housing or which is integral with the sprocket carrier,
the transmission further comprising coupling means for coupling the transmission with the wheel hub and a planetary gear set which is present in the transmission housing and is provided with three rotational members, of which a first rotation body forms a ring wheel and is connected to the transmission housing, a second rotation body forms a planet carrier and is connected to the coupling means and a third rotation body forms a sun wheel and is engageable with the wheel axle,
wherein the first rotation body is connected to the second rotation body via a first clutch designed as a switchable clutch and the third rotation body is connected to the wheel axle via a second coupling.

2. The transmission according to claim 1, wherein the first clutch is designed as a clutch with switchable pawls configured to fix parts to be coupled relative to each other in the direction of rotation.

3. The transmission according to claim 1, wherein the first clutch is designed as a clutch which, under load of the transmission, is configured to both couple and decouple.

4. The transmission according to claim 1, wherein the second coupling is designed as a disengageable clutch.

5. The transmission according to claim 4, wherein the second coupling is designed as a switchable clutch with pawls configured to fix parts to be coupled relative to each other in the direction of rotation.

6. The transmission according to claim 1, further comprising a switching mechanism for switching of the switchable clutch, wherein the switching mechanism is located inside the transmission housing.

7. The transmission according to claim 6, wherein the switching mechanism comprises a ring which by axially moving or by tangentially rotating is configured to operate the switchable clutch.

8. The transmission according to claim 6, wherein the switching mechanism comprises an electrical actuator, wherein the actuator comprises a stator which is mounted on or in the wheel axle.

9. The transmission according to claim 8, wherein the ring and the actuator are present in the transmission housing at a side of the planetary gear set facing away from the coupling means.

10. The transmission according to claim 8, wherein the actuator is provided with connecting pins that stabbing through one or more openings in or over the wheel axle, and are isolated from the wheel axle.

11. The transmission according to claim 1, wherein the second coupling is designed as a freewheel.

12. The transmission according to claim 1 wherein the transmission comprises a third clutch, which is present between the first rotation body and the transmission housing and is designed as a freewheel.

13. The transmission according to claim 12, wherein the transmission comprises a fourth clutch, which is present between the second rotation body or the first clutch, and the transmission housing and is designed as a freewheel.

14. A rear wheel axle for a bicycle comprising a wheel axle as well as a transmission as claimed in claim 1 being mounted on the wheel axle, wherein the third rotation body is connected via the second clutch to the wheel axle.

15. A rear wheel for a bicycle comprising the rear wheel axle according to claim 14, as well as a wheel hub mounted on the wheel axle, and coupled to the transmission, wherein the wheel hub near a first end is mounted on the wheel axle via a wheel hub bearing and at a second end is provided with further coupling means which are coupled to the coupling means of the transmission.

16. The rear wheel according to claim 15, wherein the coupling means and the further coupling means are designed as a form-closed connection.

* * * * *